United States Patent [19]
Lee et al.

[11] Patent Number: 5,452,283
[45] Date of Patent: * Sep. 19, 1995

[54] LENS/MIRROR TOWER FOR AN OPTICAL STORAGE DEVICE

[75] Inventors: Neville K. Lee, Sherbourn; Amit Jain, Marlboro, both of Mass.; Erwin Keppeler, Marktoberdorf, Germany

[73] Assignee: Quantum Corporation, Milpitas, Calif.

[*] Notice: The portion of the term of this patent subsequent to Nov. 9, 2010 has been disclaimed.

[21] Appl. No.: 79,484

[22] Filed: Jun. 18, 1993

Related U.S. Application Data

[63] Continuation of Ser. No. 847,520, Mar. 6, 1992, Pat. No. 5,260,928.

[51] Int. Cl.$^6$ .............................................. G11B 7/085
[52] U.S. Cl. .................................. 369/112; 369/119; 369/121; 369/44.12; 369/36
[58] Field of Search ........................ 369/119, 112, 44.4, 369/44.15, 121, 44.12, 36; 427/152; 264/1.5, 1.7, 25

[56] References Cited

U.S. PATENT DOCUMENTS

| | | | |
|---|---|---|---|
| H445 | 3/1988 | Bock et al. | 264/1.7 |
| 4,061,518 | 12/1977 | Burroughs et al. | 427/152 |
| 4,798,690 | 1/1989 | Levy | 264/1.7 |
| 4,957,663 | 10/1990 | Zwiers | 264/1.7 |
| 4,983,335 | 1/1991 | Matsuo et al. | 264/25 |
| 4,999,142 | 3/1991 | Fukushima et al. | 264/1.5 |
| 5,260,928 | 11/1993 | Lee et al. | 369/112 |

*Primary Examiner*—Paul M. Dzierzynski
*Assistant Examiner*—Kim-Kwok Chu
*Attorney, Agent, or Firm*—Cesari and McKenna

[57] ABSTRACT

A lens/mirror tower (LMT) of a multiple-disk array, optical storage system includes a plurality of lens and mirror elements integrally formed on a monolithic, optically-clear substrate. There is a specific lens/mirror set for each recording disk surface of the optical storage device; however, the mirror elements are preferably configured as one reflective surface of the substrate. The lenses are molded onto the opposite surface in a single operation that fixes their relative positions. The LMT is generally fabricated using a lens replication process. Initially, a glass substrate is formed with a trapezoidal configuration. A lens array mold is also formed with a plurality of cavities arranged in overlapping pairs. The cavities are filled with optical-quality resin and the mold is applied to the surface of the substrate opposing the reflective angular, e.g., 45°, surface. Once cured, the resin serves as an array of lenses that are aligned with the optical paths to the objective lenses of the disk array.

12 Claims, 7 Drawing Sheets

LENS/MIRROR TOWER FOR AN OPTICAL STORAGE DEVICE

This is a continuation of U.S. patent application Ser. No. 07/847,520, filed on Mar. 6, 1992, now U.S. Pat. No. 5,260,928 issued on Nov. 9, 1993.

FIELD OF THE INVENTION

This invention relates generally to optical systems and, more specifically, to a lens/mirror tower arrangement for an optical storage device.

BACKGROUND OF THE INVENTION

Conventional optical storage devices typically employ a single optical disk having a single recording surface for storing information. Use of a single disk allows the optical components, such as a mirror and a lens, to be arranged relative to the recording surface in a manner that optimizes the size and cost of the device. Although this results in a low-cost device having a relatively small form factor, its storage capacity is limited to that provided by a single surface. Copending and commonly-assigned U.S. patent application of Lee et al., for OPTICAL STORAGE SYSTEM, filed herewith, describes a multiple-surface system in which the beam from a single laser is steered by a stationary galvanometer-rotated mirror to optical heads associated with the respective recording surfaces. The heads are mounted on a carriage that moves them radially over the surfaces for access to selected data tracks on the surfaces.

Specifically, the rotating mirror selectively directs the beam to one of a vertical array of uniquely oriented deflection mirrors. When a deflection mirror receives the beam, it reflects it along a plane parallel to and close to a corresponding disk surface. The beam then passes through an imaging lens on the way to a 45° mirror that redirects the beam radially toward an objective lens in the optical head associated with that surface. The objective lens, in turn, converges the beam on a small spot on the selected data track.

Therefore, it is apparent that the mirrors and lenses must be precisely aligned. Moreover, they must occupy a small space so that the form factor for the overall system is comparable with that of conventional multiple-disk, magnetic disk drives. Further, the lens and mirror optical components must be manufacturable within the cost constraints of the conventional single-disk optical components.

Various fabrication techniques might be employed to produce a multiple lens and mirror arrangement. One approach involves the construction of two separate components: a multiple mirror component and a multiple lens component. However, the cost of these parts, particularly the lens elements, is relatively high. Fabrication of the separate components entails individual assembly, including discrete adjustment and bonding, of each mirror element and each lens element onto respective portions of a precast housing. Moreover, some of the lenses must overlap because of the close proximity of the associated recording disk surfaces. This requires truncation of lenses and fitting together of the truncated lenses, a costly procedure. The assembly process further necessitates manual alignment of the mirror and lens components relative to each other.

An alternative approach involves plastic molding of an integrated lens/mirror unit. Although this process provides a low-cost unit, current molding technology typically cannot provide the level of wavelength quality needed for the mirror elements. This deficiency further causes stress in the plastic substrate material and leads to birefringence of the optical beam when passing through substrate, thereby degrading the accuracy and reliability of the component.

Therefore, it is desirable to provide a reliable, lens/mirror tower for use in a multiple-disk, optical storage device.

Specifically, it is desirable to provide a tower in which the optical elements are precisely configured and positioned so that the tower can be used in a multiple-disk optical storage system.

It is also desirable to provide a low-cost method for producing such lens/mirror towers.

In addition, it is desirable to provide a fabrication process that enables installation of mass produced lens/mirror towers in an optical storage device without further alignment of the lens/mirror elements.

SUMMARY OF THE INVENTION

Briefly, a lens/mirror tower (LMT) incorporating the invention includes a plurality of lens and mirror elements integrally formed on a monolithic, optically-clear substrate. Specifically, there is a lens/mirror set for each recording disk surface of the optical storage device. However, in the preferred embodiment of the invention, the mirror elements are configured as one reflective surface of the substrate. The lenses are precisely molded together onto the opposite surface in a single operation that fixes their relative positions.

The LMT is generally fabricated using a lens replication process. First, a glass substrate is formed with a trapezoidal configuration; that is, the substrate is a rectangular parallelopiped except for one end surface which is oriented at a 45° angle with respect to the opposite surface. A lens array mold is formed with a plurality of cavities arranged in overlapping pairs. The cavities are filled with optical-quality resin and the mold is applied to the surface of the substrate opposite the angled surface. Once cured, the resin serves as an array of lenses having relative positions that are appropriate for alignment with the optical paths to the objective lenses of the disk array. Accordingly, the lens replication process provides a fast and low-cost, yet precise, fabrication method particularly suited for high-volume manufacturing.

BRIEF DESCRIPTION OF THE DRAWINGS

The above and further advantages of the invention may be better understood by referring to the following description in conjunction with the accompanying drawings, in which.

DETAILED DESCRIPTION OF ILLUSTRATIVE EMBODIMENTS

Figure 1:
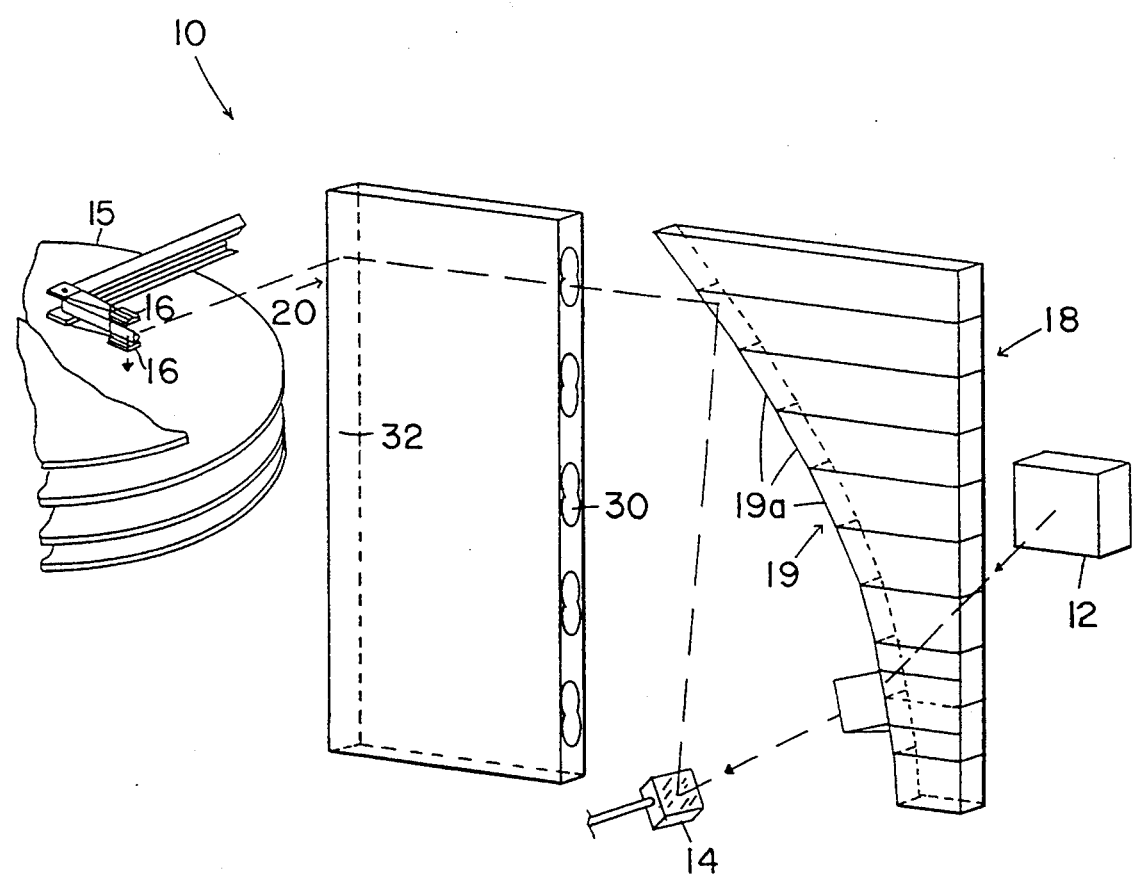
FIG. 1 is a diagram of an optical beam distribution system for a multiple-disk, magneto-optical storage device in which the method and apparatus of the present invention may be utilized.

FIG. 1 depicts an optical beam distribution system 10 for a multiple-disk array, magneto-optical storage device. The beam distribution system 10 includes a stationary optics package 12 for generating an optical beam and a galvanometer-controlled mirror, i.e., "galvo mirror" 14, for distributing the beam to one of several optical head assemblies 16. Each of the head assemblies is associated with a recording surface of a horizontally disposed optical disk 15 that rotates about a vertical axis. The galvo mirror 14 distributes the beam to a deflection mirror tower (DMT) 18 having a multi-faceted mirror surface 19 arranged to deflect the beam so that it is passed to a head assembly 16 of a selected disk. Specifically, each facet 19a of the surface 19 is positioned at the same height as a corresponding head assembly 16 and it is oriented so as to reflect the beam from the galvo mirror 14 horizontally to a lens/mirror set 30, 32 contained in a lens mirror tower (LMT) 20. The lens/mirror set 30, 32 redirects the beam horizontally to the corresponding head assembly 16, which redirects the beam vertically to an objective lens (not shown).

Figure 2:
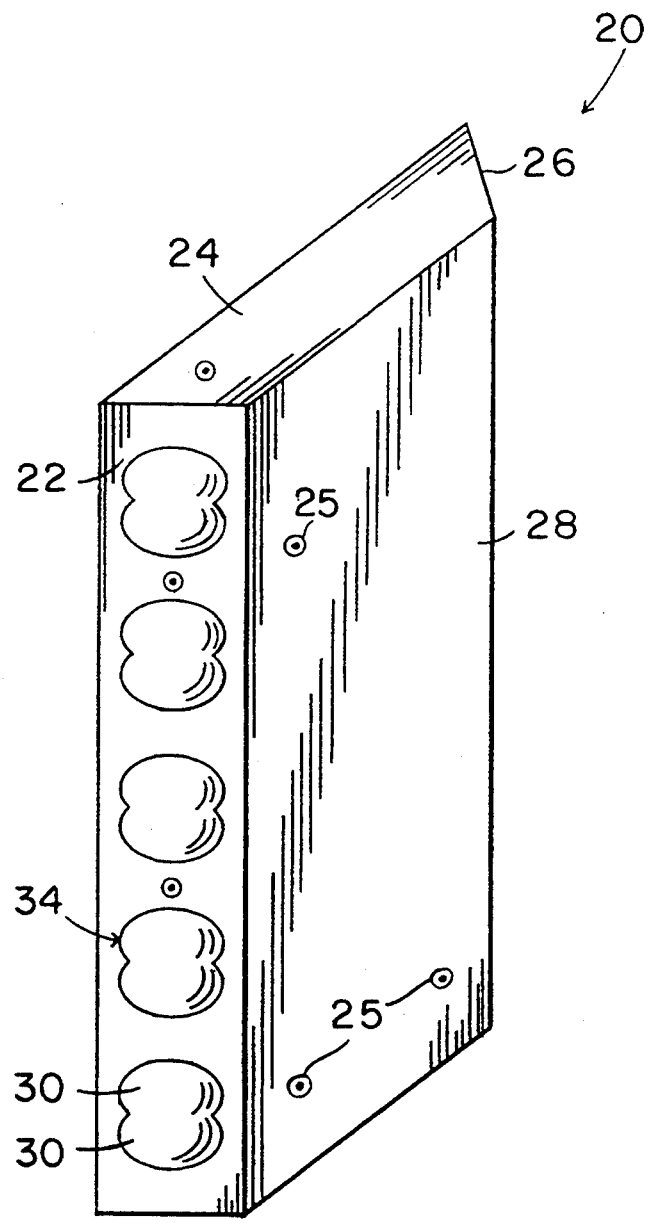
FIG. 2 is a perspective front view of a lens/mirror tower (LMT) in accordance with the invention.

The LMT 20 includes a plurality of lens and mirror elements integrally formed on a solid, monolithic, optically clear substrate. FIG. 2 illustrates an embodiment of the LMT 20 having a generally trapezoidal horizontal cross section defining a wedge-like shape. The vertical front surface 22 is generally planar so as to provide a foundation for the lenses 30, which are vertically arranged thereto. The back, angular, surface 26 of the LMT 20 is oriented at a 45° angle relative to the front surface 22 and is preferably coated with a reflective material so as to serve as a mirror. The side 28 includes a plurality of areas that function as datum points 25 to position the substrate in a fixture during fabrication of the LMT structure, as described below in connection with FIG. 5. Additionally, the datum points 25 may be used to accurately position the LMT within the optical beam distribution system 10.

There is a separate lens/mirror set 30, 32 (FIG. 1) for each recording disk surface of the optical storage device array; however, in the preferred embodiment of the invention, the mirror elements are configured as the single reflective surface 26 of the LMT. Because of the close proximity of disks 15 of the array, the lenses are arranged in overlapping pairs 34; this intersecting arrangement enables alignment of the optical axis of the lenses 30 of a pair 34 with the objective lenses associated with the closely-spaced recording surfaces of adjacent disks 15, as described further below.

In a typical embodiment of the invention, there are five lens pairs 34, for a total of ten lenses 30. Each lens 30 functions as an imaging lens to transfer the reflection of the optical beam at the galvo mirror 14 to the front focal point of an objective lens. Specifically, the lens 30 passes the optical beam to the 45° mirror surface 26, which then directs the beam to the head assembly 16 containing the objective lens.

In accordance with the invention, an LMT may be fabricated as follows. Initially, a generally rectangular substrate composed of glass material is constructed. The glass material is preferably boro-silicate crown glass, but other similar materials may be used. Use of bulk glass material improves the optical quality of the substrate and facilitates beam passing through the substrate, as compared to plastic molding. Because the LMT is a relatively minute structure having dimensions on the order of tens of millimeters (mm), the base substrate is preferably larger than the LMT so that a plurality of LMT blocks may be formed from the substrate.

Figure 3A:
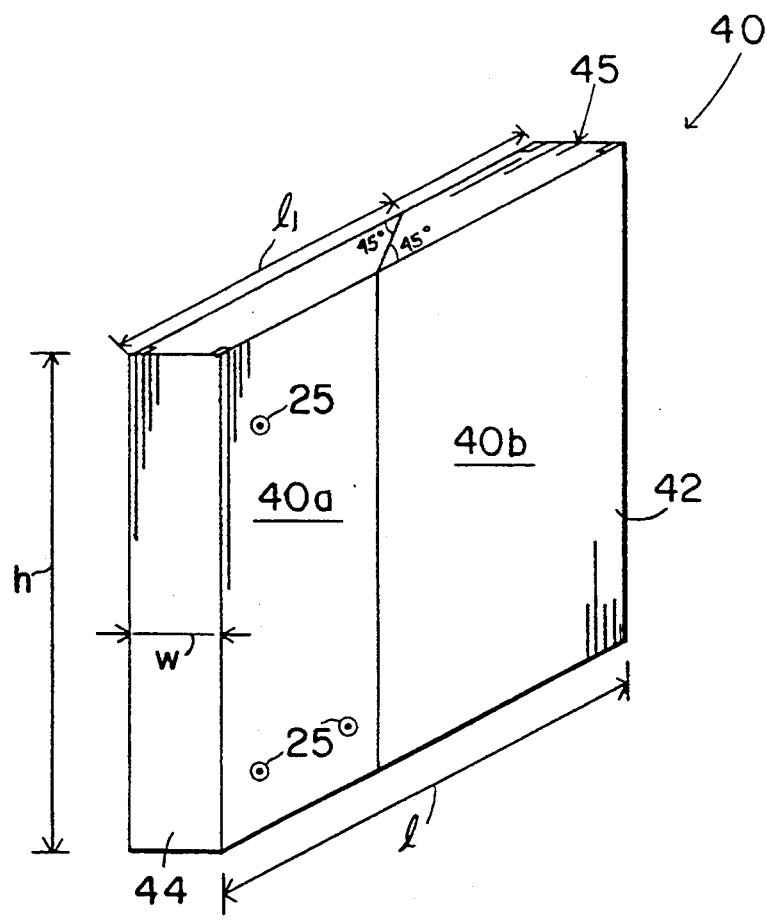
FIG. 3A is a schematic diagram of a preferred embodiment of a substrate used to fabricate the LMT of FIG. 2.

FIG. 3A depicts a base substrate 40 with a width w of 4 mm, a height h of 50.14 mm and a length l of 50.6 mm. The sides 42 of the substrate are polished to a smooth finish using a conventional optical grinding and polishing machine. Specifically, the substrate 40 is secured to a fixture plate (not shown) and polished with a polishing plate that is typically made of granite. If necessary, the front surface 44 and back surface 45 are ground to ensure that these surfaces are normal to the side surfaces 42 of the substrate. The substrate 40 is then cut along its side at a distance $l_1$ of 27.3 mm from its front surface 44; the cut is made at a 45° angle, as shown in the drawing. This produces two wedge-like, trapezoidal substrates 40a,b, each having an angular surface oriented at 45° relative to the front and back surfaces. The front, back and angular surfaces of each substrate are then polished to a smooth finish. Again, the bulk glass substrate enables use of conventional grinding techniques to ensure a precisely flat angular (mirror) surface, which is difficult to attain using current plastic molding technology.

Figure 3B:
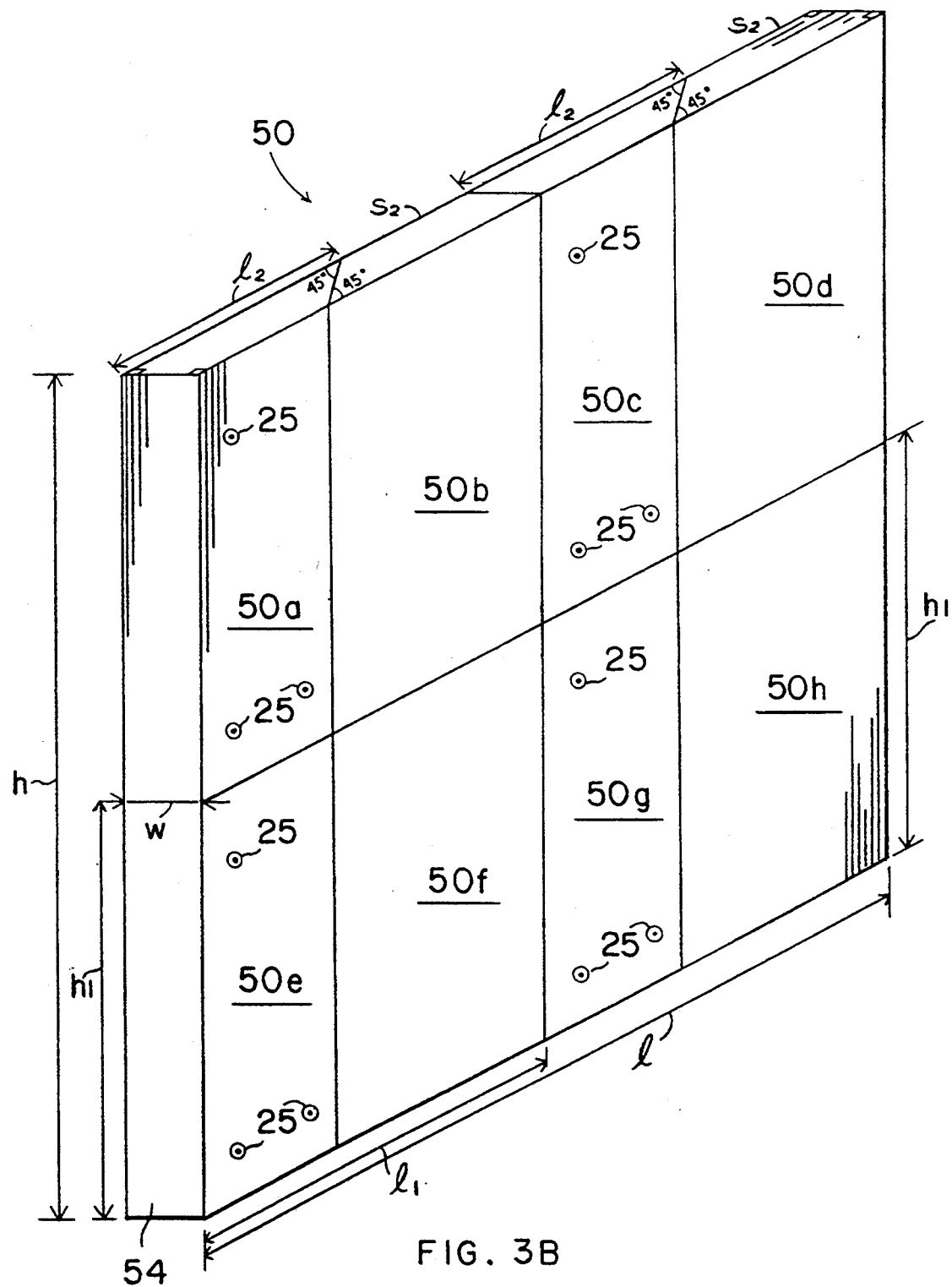
FIG. 3B is a schematic diagram of an alternate embodiment of a substrate used to fabricate the LMT of FIG. 2.

FIG. 3B depicts an alternate embodiment of a base substrate designated 50. Here, typical dimensions of the generally rectangular substrate 50 are: w=4 mm, h=100.28 mm and l=101.2 mm. Eight wedge-like substrates 50a–h are formed by (i) slicing the substrate in half (at a 90° angle) along its side at a distance $l_1$ of 50.6 mm from the front surface 54; (ii) slicing the resulting two substrates at a 45° angle along their sides $s_2$ at a distance $l_2$=27.3 mm from the front surface 54 and the front surface (not shown) formed by step (i) above, respectively; and (iii) slicing each of the four resulting substrates in half (at a 90° angle) along the front surfaces at a distance $h_1$=50.14 mm from the bottom surfaces.

Figure 4:
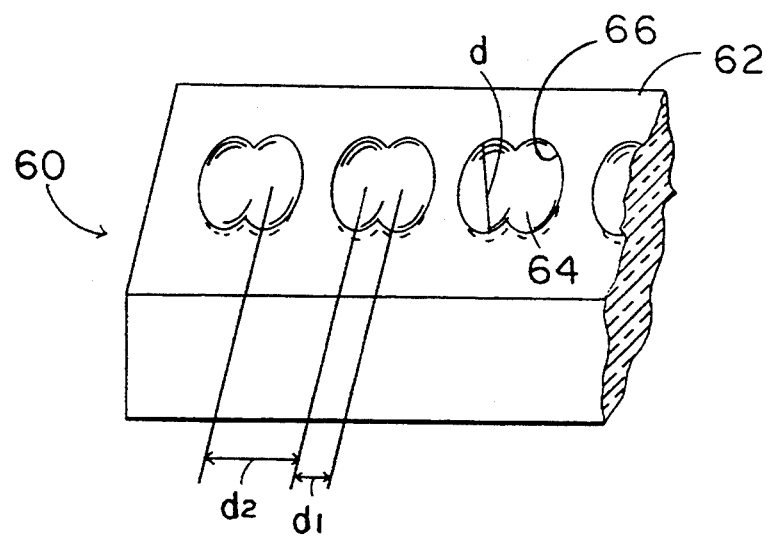
FIG. 4 is a perspective view, partially broken away, of a lens array mold used to construct lenses during fabrication of the LMT in accordance with the invention.

Referring to FIG. 4, a lens array mold 60 is used to construct the lenses arranged along the front surfaces 44 of the substrates 40. The top surface 62 of the mold 60 has a plurality of lens cavities 64 formed therein. The mold is preferably constructed from a glass substrate material having resin adherence properties different from that of the glass material used for the substrates 40. The mold is adapted for insertion into a fixture having adjustable references when mated to the substrates, as described below.

Specifically, five pairs of overlapping cavities 64 are formed in the surface 62 using a diamond-tipped, precision cutting tool (not shown). For a particular lens, each cavity 64 has a diameter d of 3.1 mm and a radius of curvature of 13,381 mm. The spacing $d_1$ between the centers of the cavities of an overlapping pair is 2.94 mm and the distance $d_2$ between the centers of cavities of adjacent pairs is 7.86 mm. These distances are determined by the spacing between the recording disk surfaces of adjacent disks and the recording disk surfaces of each disk, respectively. Although the diamond-tipped cutting tool creates a generally smooth, inner surface of the cavities 60, the inner walls 66 are thereafter mechanically lapped to ensure a very smooth finish. This is because imperfections in the cavities will be impressed on the lenses during the fabrication process. Therefore, the initial process of forming the mold may be time consuming because of the required precision, but the resulting mold 60 may be used many times during subsequent "lens replication" processes.

Figure 5:
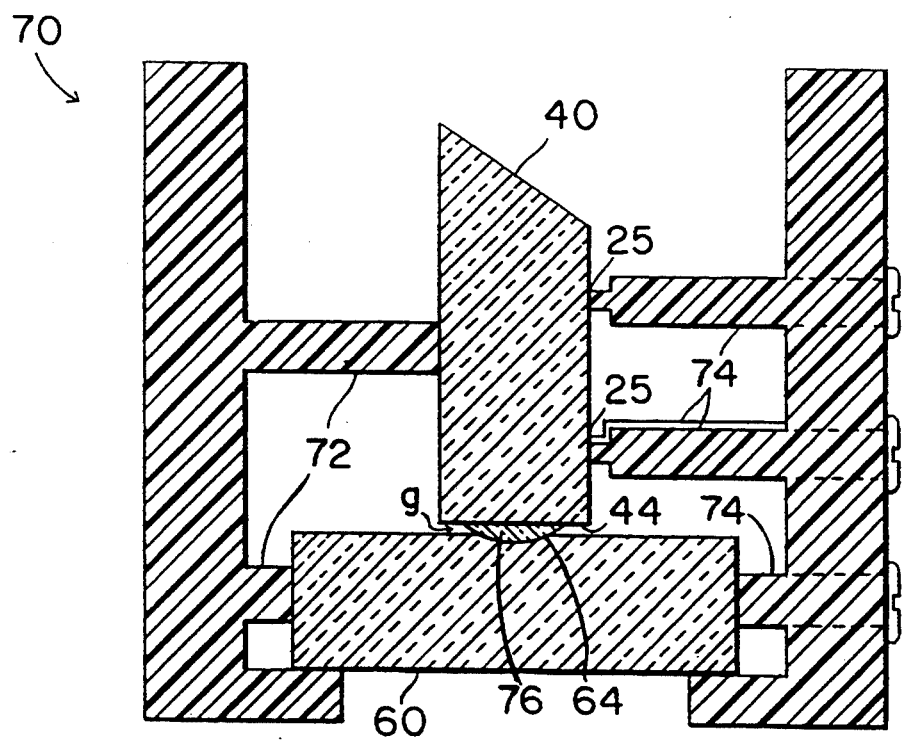
FIG. 5 is a diagrammatic view of a mating fixture used to provide pressure contact between the substrate and the mold during fabrication of the LMT.

The mold 60 is then placed into a mating fixture 70, shown in FIG. 5, that is configured and arranged to provide pressure contact between the substrate 40 and mold 60. It is to be understood that the elements in FIG. 5 (and FIGS. 1–4 and 6–8) are somewhat exaggerated and are not drawn to scale for purposes of ease of depiction and ease of description. Specifically, no attempt has been made to depict the exact spacing between elements or the exact dimensions of the elements, although the drawings depict the relationship relative to one another. The fixture 70 includes a plurality of fixed arms 72 arranged to contact the mold 60 and substrate 40 at a predetermined reference plane. Adjustable arms 74 are provided to secure these pieces in mating contact relation to one another.

The mold cavities 64 are then filled with an optical-quality resin 76, such as clear epoxy material, which may be curable by ultra-violet (UV), as well as thermal, radiation. The substrate 40 is placed into the fixture 70 and pushed against the fixed arms 72 to establish, as noted, a defined reference plane for the front surface 44 relative to the cavities 64 of the mold 60. The adjustable arms 74 are then extended to contact the substrate 50 at the defined datum points 25 (FIG. 2) to ensure alignment of the substrate against the mold cavities 64. As shown in the drawing, a screw-type pushing tool may be used as an adjustable arm 74 to apply pressure at a datum point.

Figure 6:
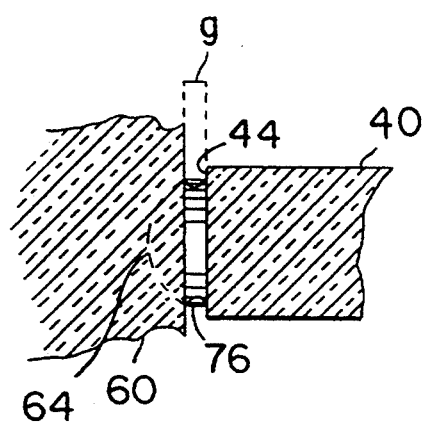
FIG. 6 is a diagrammatic view of the interface between the substrate and mold.

The datum points 25 are arranged such that there is a small gap g between the front surface 44 of the substrate and the mold 60; as depicted in FIG. 6, the gap g allows the epoxy 76 to slightly overflow beyond the diameter of the cavities 64 to enable adjustments and compensation during alignment of the mold 60 to the substrate 40. Referring again to FIG. 5, once the positions of the adjustable arms 74 are established, they are locked to secure the substrate 40 against the mold 60. The epoxy is then cured.

Figure 7:
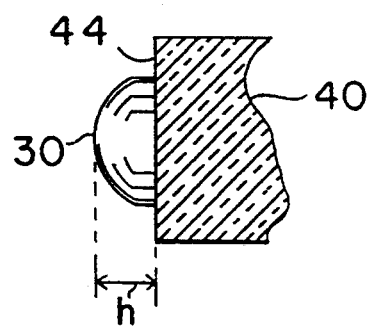
FIG. 7 is a diagrammatic view of a lens fabricated by a lens replication process in accordance with the invention.

The mold is thereafter separated from the substrate leaving a plurality of precisely-molded, replicated lenses 30 having a predetermined shape and height on the front surface 44 of the substrate 40, an example of which is shown in FIG. 7. Specifically, the geometry of the lenses 30 compensates for any differences in the indices of refraction of the lenses and substrate materials. In the illustrated example, the thickness t of each replicated lens 30 is approximately 0.25 mm. As noted, the substrate and mold materials are chosen such that the epoxy adheres to the substrate and not to the mold.

Figure 8:
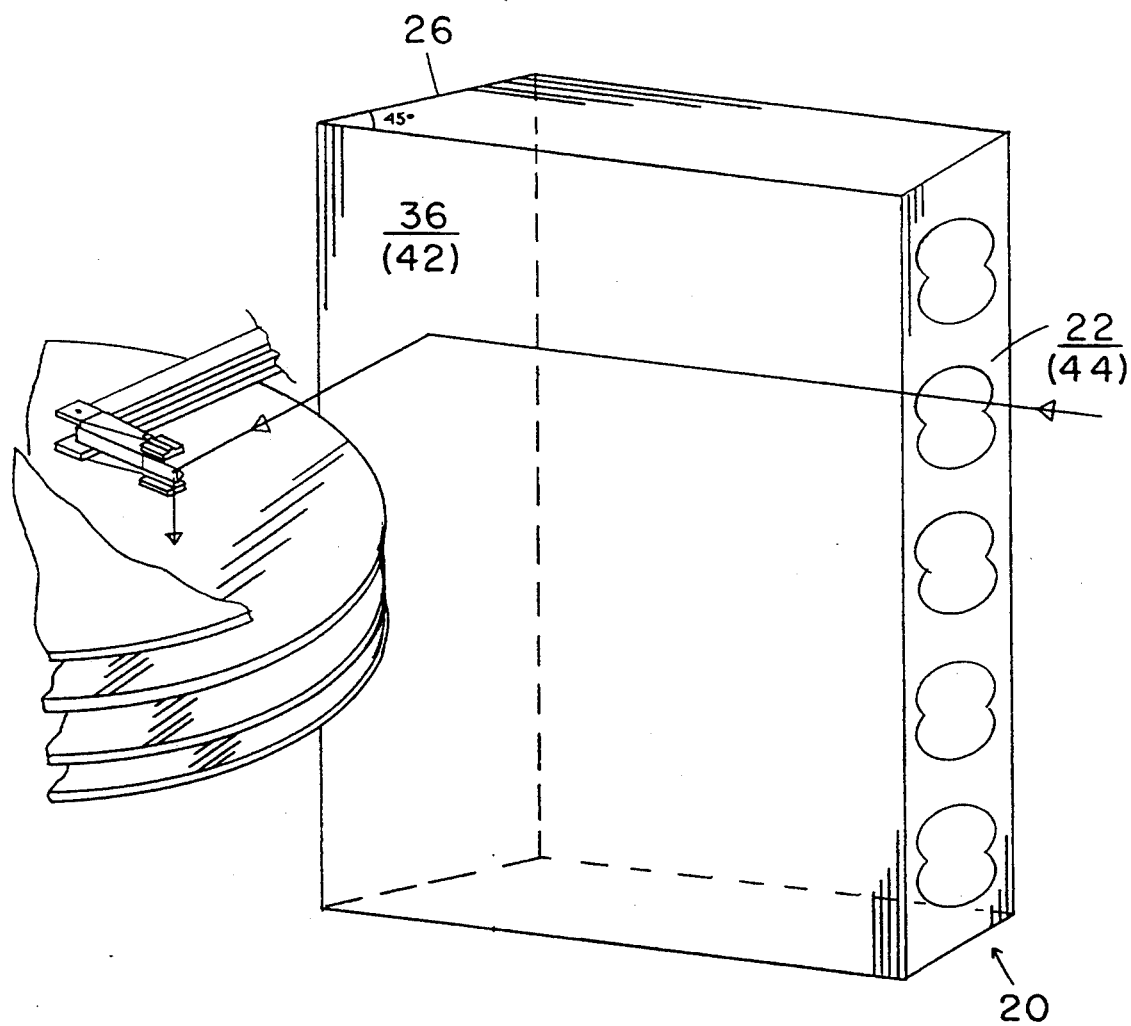
FIG. 8 is a perspective side view of an LMT fabricated in accordance with the invention.

Refer now to FIG. 8. The front surface 44 (hereinafter 22 as designated in FIG. 2) and the longer side 42 (now designated 36) are coated with anti-reflective material, e.g., magnesium fluoride (MGF2). The 45° surface 26 (FIG. 2) is coated with a multi-layer dielectric material, such as titanium dioxide ($TiO_2$) and silicon dioxide ($SiO_2$), that provides greater than 99% reflection of an incident beam while minimizing the phase shift of the beam. However, the 45° surface 26 may not need the reflective coating because of the excellent optical quality of mirror due to the principle of total internal reflection, i.e., the angle of incidence at the 45° surface is greater than the critical angle of the material. This completes fabrication of the LMT 20.

The invention provides a high-precision lens/mirror tower capable of high-volume, repeatable production and at low-cost. The monolithic LMT arrangement integrates the functions of individual mirrors with a single-surface lens array, thereby ensuring alignment between the lens and mirror elements, while increasing the accuracy of the tower by reducing the number of discrete components. The common lens surface also allows for overlapping lenses needed to precisely direct a laser beam to objective lenses located between closely-situated disks.

The foregoing description has been directed to specific embodiments of this invention. It will be apparent, however, that variations and modifications may be made to the described embodiments, with the attainment of some or all of their advantages. Therefore, it is the object of the appended claims to cover all such variations and modifications as come within the true spirit and scope of the invention.

What is claimed is:

1. A component of a storage device having a plurality of optical disks, said component comprising:
   an optically-clear substrate including a front surface and a back surface oriented at an angle relative to said front surface, said angular back surface serving as a mirror to direct an optical beam to any of said optical disks; and
   a plurality of lenses affixed to said front surface of said substrate, said lenses arranged for passing said optical beam to said angular back surface of said substrate and onto said disks.

2. The component of claim 1 wherein said angular back surface is oriented at a 45° angle relative to said front surface.

3. The component of claim 2 wherein said optically-clear substrate is a rectangular parallelopiped except for said angular back surface.

4. The component of claim 3 wherein said substrate is composed of glass material.

5. The component of claim 1 further comprising means, applied to said angular back surface, for minimizing phase shift of said directed optical beam.

6. The component of claim 5 further comprising means for positioning said component within the storage device.

7. The component of claim 6 wherein said lenses are arranged as overlapping pairs of said lenses.

8. The component of claim 7 wherein said lenses are composed of an optical-quality resin.

9. Apparatus of a storage device having a plurality of optical disks with recording surfaces for storing data, said apparatus comprising:
   an optically-clear base substrate having a trapezoidal configuration with a generally planar front surface and an angular back surface having a plurality of mirror elements integrally formed thereon, said mirror elements configured to direct an optical beam to any of said optical disks;
   means, applied to said angular back surface, for minimizing phase shift of said directed optical beam;
   means, affixed to said substrate, for positioning said apparatus within the storage device; and an array of lenses affixed to said planar front surface of said substrate, said lenses having positions relative to one another to enable passing of said optical beam to said angular back surface of said substrate and onto said recording surfaces of any of said optical disks.

10. The apparatus of claim 9 wherein said minimizing means comprises a multi-layer dielectric material.

11. The apparatus of claim 10 wherein said positioning means comprises a plurality of datum points.

12. The apparatus of claim 11 wherein said plurality of mirror elements are configured as one reflective surface of said substrate.

* * * * *